United States Patent [19] [11] Patent Number: 4,653,007
Osanai et al. [45] Date of Patent: Mar. 24, 1987

[54] APPARATUS FOR CONTROLLING CONTINUOUSLY VARIABLE TRANSMISSION

[75] Inventors: Akinori Osanai, Susono; Takao Niwa, Toyota, both of Japan

[73] Assignee: Toyota Jidosha Kabushiki Kaisha, Toyota, Japan

[21] Appl. No.: 657,666

[22] Filed: Oct. 4, 1984

[30] Foreign Application Priority Data

Oct. 5, 1983 [JP] Japan .............................. 58-185071

[51] Int. Cl.$^4$ ............................................. B60K 41/12
[52] U.S. Cl. ................................. 364/424.1; 74/866; 474/12; 474/18
[58] Field of Search ............... 364/424.1; 74/858, 859, 74/860, 862, 866; 474/11, 12, 18, 28

[56] References Cited

U.S. PATENT DOCUMENTS 4,291,594  9/1981  Baudoin ................................ 74/866
4,354,236 10/1982  Miki et al. .......................... 364/424.1
4,470,117  9/1984  Miki et al. .......................... 364/424.1
4,543,077  9/1985  Yamamuro et al. .................. 474/12

FOREIGN PATENT DOCUMENTS 0160661  9/1983  Japan .............................. 364/424.1

Primary Examiner—Parshotam S. Lall
Attorney, Agent, or Firm—Oblon, Fisher, Spivak, McClelland & Maier

[57] ABSTRACT

A continuously variable transmission (CVT) is controlled such that an actual engine speed becomes equal to a desired engine speed. The desired engine speed is set to a value not less than a minimum engine speed for fuel cut so that fuel is to be cut when an intake throttle valve is at a position below a predetermined position during the deceleration of a vehicle. When the position of the throttle valve exceeds the predetermined one, the desired engine speed is set during a predetermined period to a value different from a usual value which is defined as a function of parameters of the vehicle.

2 Claims, 8 Drawing Figures

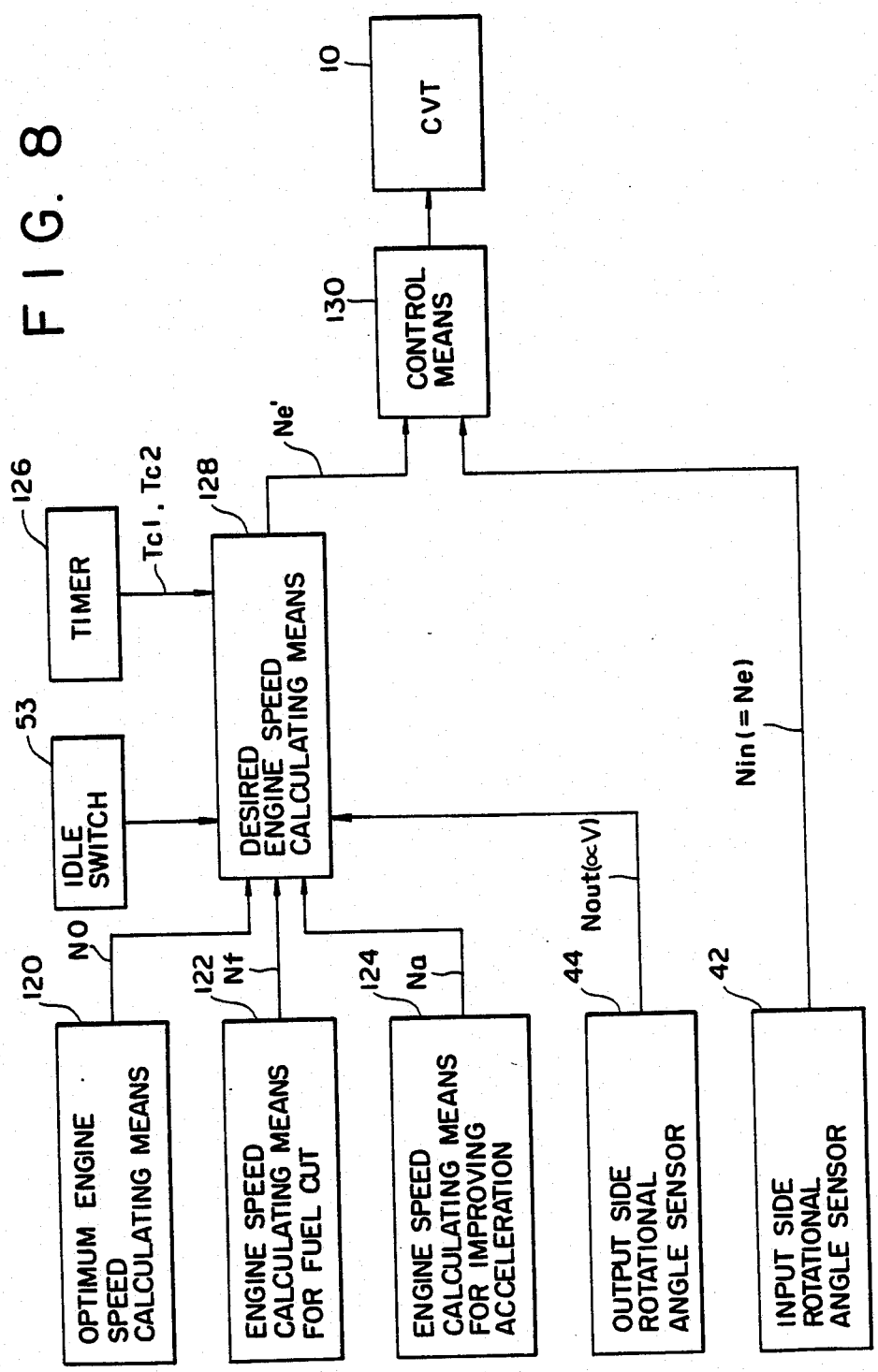

APPARATUS FOR CONTROLLING CONTINUOUSLY VARIABLE TRANSMISSION

BACKGROUND OF THE INVENTION

1. Field of the Invention

This invention relates to an apparatus for controlling a continuously variable transmission (hereinafter called CVT) used for a power transmission system of a vehicle.

2. Description of the Prior Art

A CVT is used for a vehicle as a power transmission system which is to control continuously speed ratio e (=output side rotational speed Nout/input side rotational speed Nin) to run an internal combustion engine with a satisfactory specific fuel consumption. In general vehicles with the CVT are set the output horse power and throttle position of the engine as a function of pedalling amount of an accelerator pedal, and an engine speed Nx by which each output horse power is obtained from a minimum specific fuel consumption (unit; g/Ps.h) in the corresponding throttle position or an engine speed Nx' obtained from a proper correction corresponding to parameters of vehicle speed V or the like, on the basis of the engine speed Nx (hereinafter Nx, Nx' will be called "optimum engine speed No") is set to a desired engine speed Ne'. Also, an idle switch for detecting the idling position of the throttle valve (strictly speaking, a general idle switch is not to detect only the throttle position. It is turned on when the throttle position is below a position slightly exceeding the idling position and turned off when the throttle position exceeds said position) is provided to fully cut off ("cut") fuel for restraining fuel consumption during a period of vehicle deceleration when the idle switch is turned on, while the fuel is cut only when the engine speed Ne exceeds the minimum engine speed Nl for the fuel cut condition to avoid the engine stop. When the desired engine speed Ne' is set to said optimum engine speed No during a period of vehicle deceleration, the actual engine speed Ne becomes less than the minimum engine speed Nl for the fuel cut condition for a short time. Thus, during a period of vehicle deceleration, the desired speed Ne' is set to an engine speed Nf (provided Nf>Nl) for the fuel cut determined separately from the optimum engine speed No to increase the fuel cut time. In general travelling, the accelerator pedal may be often slightly pedalled for the purpose of restraining deceleration during deceleration of vehicle or the like purpose and then further pedalled to accelerate the vehicle. In a conventional CVT, when the accelerator pedal is slightly pedalled, the desired engine speed Ne' is largely reduced from the relative high engine speed Nf for fuel cut to the optimum engine speed No to degrade acceleration responsive property when the accelerator pedal is next pedalled substantially to accelerate the vehicle, while increasing the pedalling amount of the accelerator pedal for necessary acceleration and thereby disadvantageously degrading the specific fuel consumption.

SUMMARY OF THE INVENTION

An object of the present invention is to provide an apparatus for controlling a CVT which is to improve the acceleration responsive property and the specific fuel consumption when the accelerator pedal is slightly pedalled for deceleration and acceleration and the acceleration and the travelling condition of a vehicle are sequentially changed.

According to the present invention to achieve this object, in an apparatus for controlling the CVT for a vehicle wherein the CVT is controlled such that an engine speed Ne approaches a desired engine speed Ne', the desired engine speed Ne' is set to a value Nf exceeding the minimum engine speed Nl for fuel cut during a period of a vehicle deceleration when the throttle valve position is less than a predetermined value $\theta 1$. The desired engine speed Ne' is set as a function of a predetermined parameter (for example the optimum engine speed No for minimum fuel consumption as a function of the throttle position $\theta$) in the travelling period of the vehicle when the throttle valve position exceeds $\theta 1$. The desired engine speed Ne is held at a value (for example engine speed Na for improving acceleration) different from a value (for example the optimum engine speed No) determined by said function within a predetermined time T2 after the throttle valve position changes from one below $\theta 1$ to one exceeding $\theta 1$.

Accordingly, when the accelerator pedal is slightly pedalled for the purpose of restraining the deceleration or the like in the deceleration condition, the desired engine speed Ne' is prevented from being a low value based on said parameter and is set to a properly high value (for example Na), so that the engine speed Ne in the succeeding acceleration is rapidly raised to improve the acceleration responsive property while reducing the pedalling amount of the accelerator pedal for necessary acceleration to restrain fuel consumption.

In a preferred embodiment, the separate value (for example Na) is set to a function of the vehicle speed V. While the engine speed Ne required for acceleration varies with the vehicle speed V, the engine speed Ne is to be rapidly shifted to a required engine speed at any vehicle speed in the following acceleration by setting the separate value as the function of the vehicle speed V.

The accompanying drawings, which are incorporated in and constitute part of this specification, illustrate embodiments of the invention and, together with the description, serve to explain the principles of the invention.

BRIEF DESCRIPTION OF THE DRAWINGS

FIG. 8 is a functional block diagram showing the present invention.

DETAILED DESCRIPTION OF PREFERRED EMBODIMENT

Figure 1:
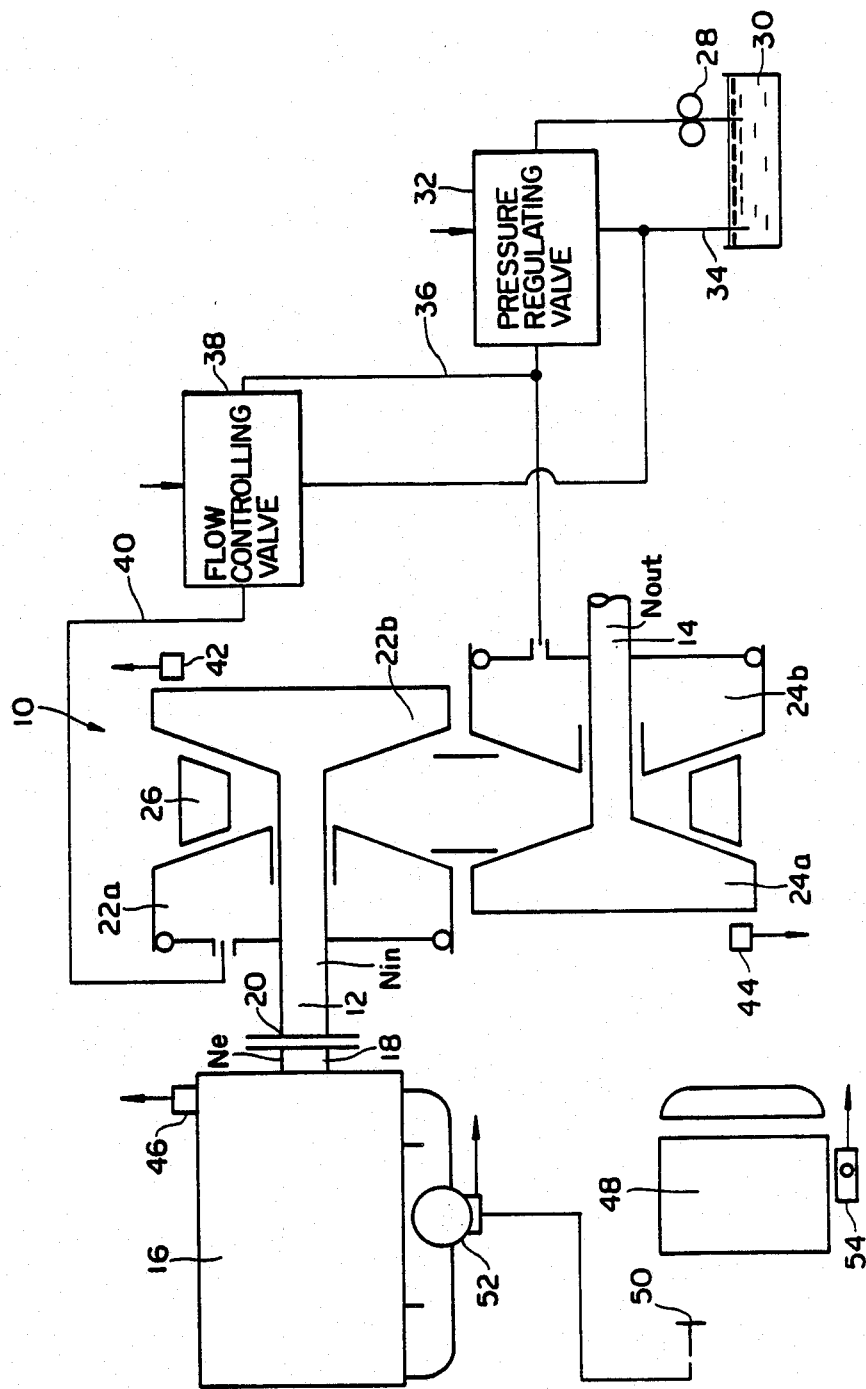
FIG. 1 is a schematic view showing the whole CVT to which the present invention is applied.

In FIG. 1, a CVT 10 is provided with an input shaft 12 and an output shaft 14 parallel to each other, the input shaft 12 being provided coaxially with a crankshaft 18 of an engine 16 and connected to the crankshaft 18 through a clutch 20. Input side pulleys 22a,22b are provided opposed to each other, one input side pulley 22a being provided axially movably as a movable pulley and rotationally fixedly on the input shaft 12 and the other input side pulley 22b being secured fixedly to the input shaft 12 as a fixed pulley. Similarly output side pulleys 24a,24b are provided opposed to each other, one output side pulley 24a being secured fixedly to the output shaft 14 as a fixed pulley and the other output side pulley 24b being provided axially movably as a movable pulley and rotationally fixedly on the output shaft 14. Opposed surfaces of the input side pulleys 22a,22b and the output side pulleys 24a,24b are formed tapered so that a belt 26 having an equilateral trapezoidal section is trained over the input and output side pulleys 22a,22b and 24a,24b. An oil pump 28 sends oil from an oil reservoir 30 to a relief valve 32 which controls line pressure in an oil path 36 by changing escaping amount of oil to a drain 34 so that the line pressure in the oil path 36 is sent to a hydraulic cylinder of the output side pulley 24b and a flow controlling valve 38 which controls supply flow of oil from the oil path 36 to an oil path 40 connected to a hydraulic cylinder of the input side pulley 22a and drain flow of oil from the oil path 40 to a drain 34. Press forces of the input and output side pulleys 22a,22b and 24a,24b against the belt 26 are controlled by oil pressure in the input and output side hydraulic cylinders, and the engaging radii of the belt 26 on the tapered surfaces of the input and output side pulleys 22a,22b and 24a,24b are varied in relation to these press forces. As a result, the speed ratio e(=Nout/Nin, provided Nout is the rotational speed of the output shaft 14 and Nin the rotational speed of the input shaft 12, and in this embodiment Nin=engine speed Ne) of the CVT 10 is varied. The line pressure in the output side hydraulic cylinder is controlled to a necessary minimum value to avoid the slip of the belt 26 and ensure power transmission for restraining drive loss of the oil pump 28, and the speed ratio e is controlled by oil pressure in the input side hydraulic cylinder. Further, while oil pressure in the input side hydraulic cylinder<oil pressure in the output side hydraulic cylinder, pressure receiving area of the input side hydraulic cylinder is larger than pressure receiving area of the output side hydraulic cylinder so that the press force of the input side pulleys 22a,22b is to be larger than that of the output side pulleys 24a,24b. Input and output side rotational angle sensors 42 and 44 detect respectively the rotational speeds Nin,Nout of the input and output shafts 12,14, and a water temperature sensor 46 detects cooling water temperature in the engine 16. A driver's seat 48 is provided with an accelerator pedal 50. The throttle valve in an intake path is interlocked with the accelerator pedal 50, a throttle position sensor 52 detects the throttle position $\theta$ and an idle switch 53 detects the idling position of the throttle valve. Strictly speaking, the idle switch 53 is not to detect accurately only the idling position. It is turned on when the throttle position has a predetermined value a little larger than the idling position, for example less than $\theta 1$, and turned off when the throttle position exceeds $\theta 1$. A shift position sensor 54 detects the shift range of a shift lever in the neighborhood of the driver's seat.

Figure 2:
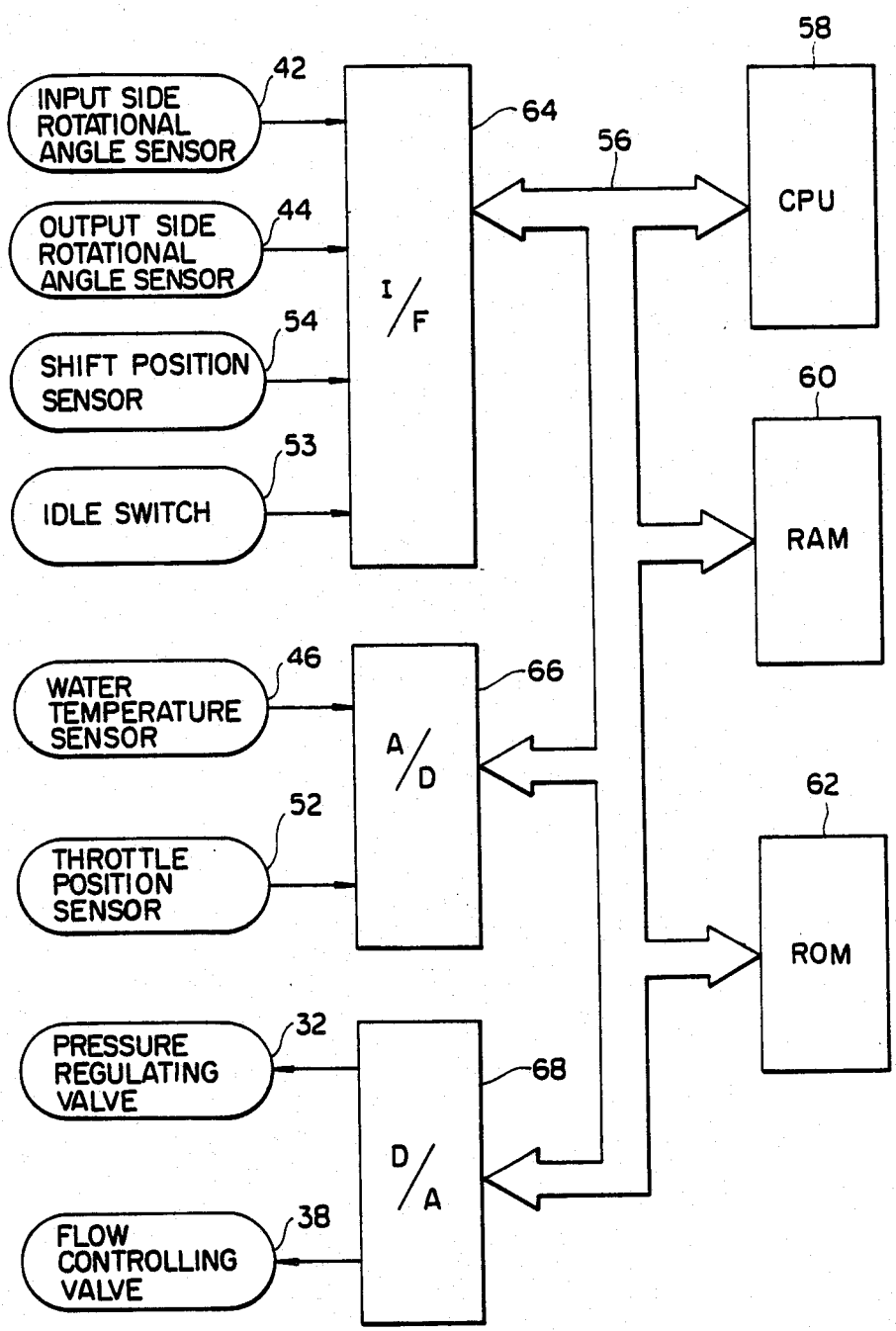
FIG. 2 is a block diagram showing an electronic control unit.

FIG. 2 is a block diagram showing an electronic control unit. By an address data bus 56 are interconnected CPU 58, RAM 60, ROM 62, I/F (interface 64, A/D (analog/digital converter) 66 and D/A (digital/analog converter) 68. The I/F 64 receives the pulse signals from the input side rotational angle sensor 42, the output side rotational angle sensor 44, the shift position sensor 54 and the idle switch 53, the A/D 66 receives analog signals from the water temperature sensor 46 and the throttle position sensor 52 and the D/A 68 generates the output pulse signal to the relief valve 32 and the flow controlling valve 38.

Figure 3:
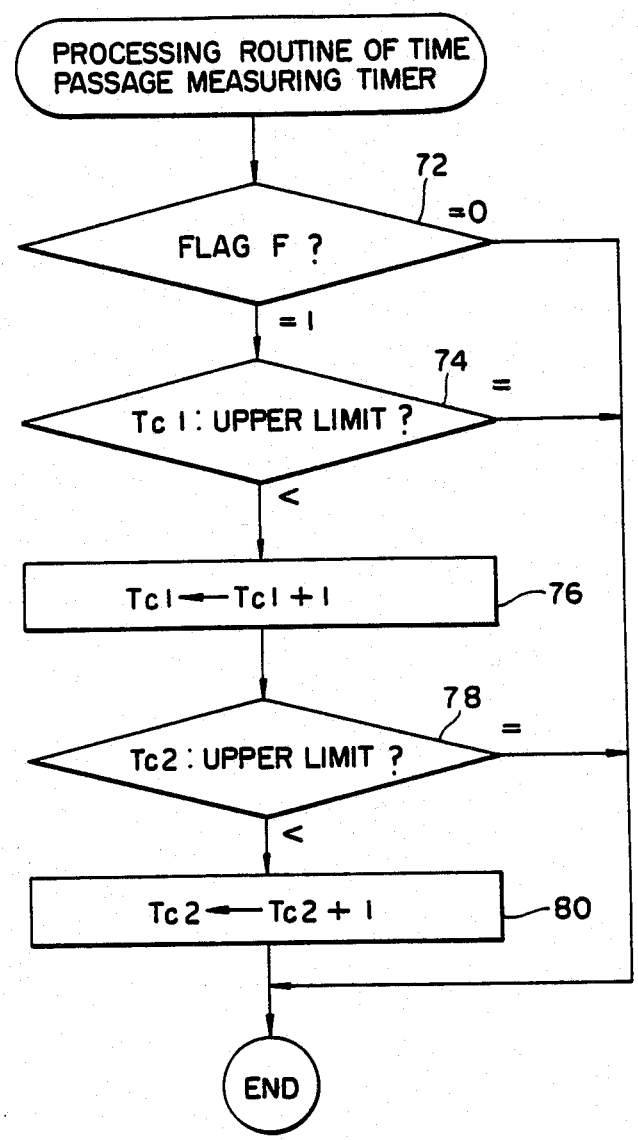
FIG. 3 is a flow chart showing a processing routine of a passed time measuring timer.

FIG. 3 is a flow chart showing a timer processing routine for processing values Tc1,Tc2 of passed time measuring timers M1,M2. A flag F is set at a certain interval of time and reset after the interval of the time. Thus the Tc1,Tc2 are increased by 1 every time a certain time elapses. Also, to prevent the passed time measuring timers M1,M2 from overflow, the upper limits of Tc1,Tc2 are limited. Referring to the details of respective steps, a value of the flag F is judged in step 72, and advance is made to step 74 when F=1, and the routine is completed when F=0. In step 74 is compared the value Tc1 of the first passed time measuring timer M1 with the upper limit thereof and advance is made to step 76 when Tc1<the upper limit and the routine is completed when Tc1=the upper limit. In step 76 Tc1 is increased by 1. In step 78 is compared the value Tc2 of the first passed time measuring timer M2 with the upper limit thereof and advance is made to step 80 when Tc22<the upper limit and the routine is completed when Tc2=the upper limit. In step 80 is increased the Tc2 by 1.

Figure 4:
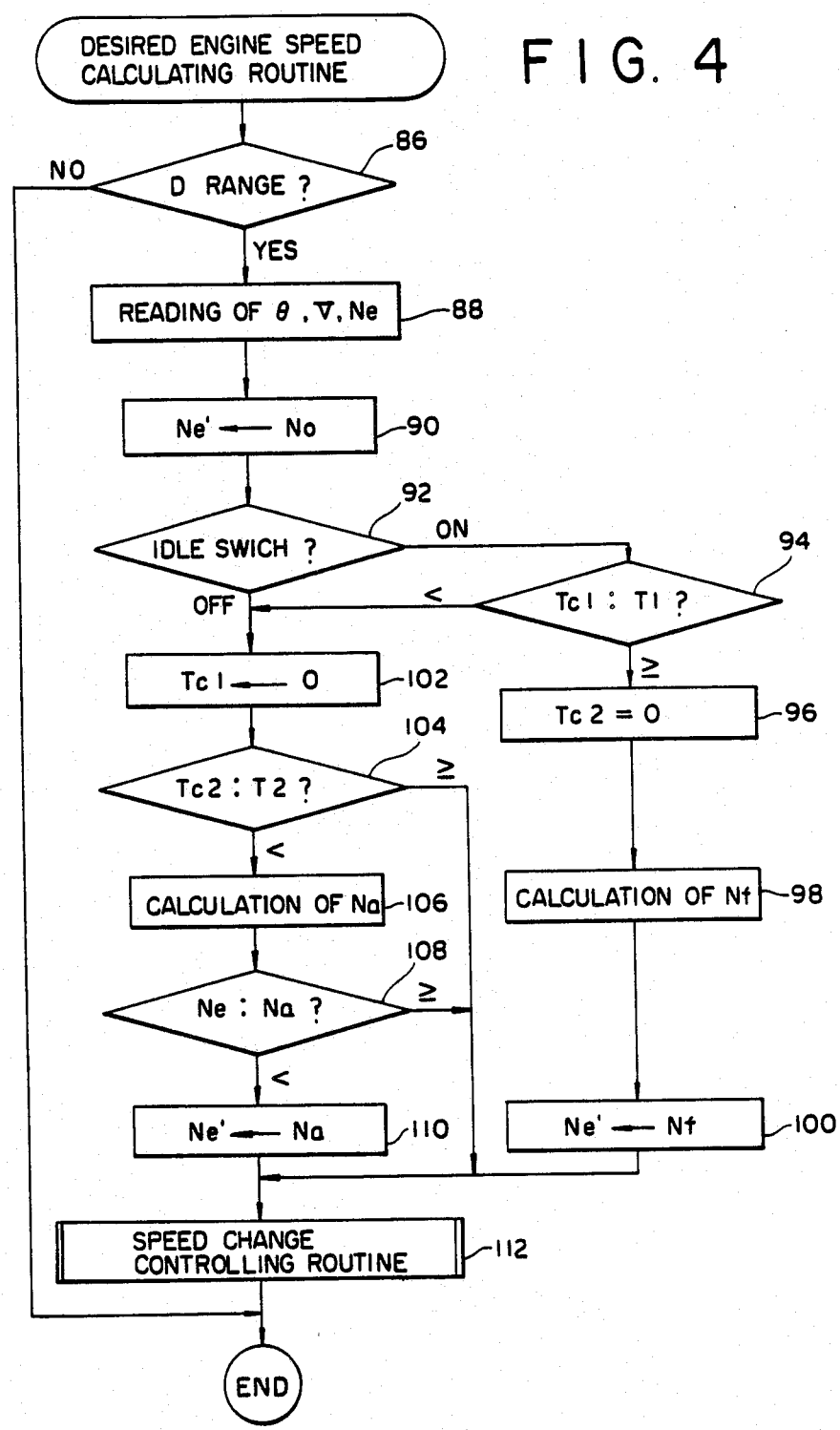
FIG. 4 is a flow chart showing a desired engine speed setting routine.
Figure 5:
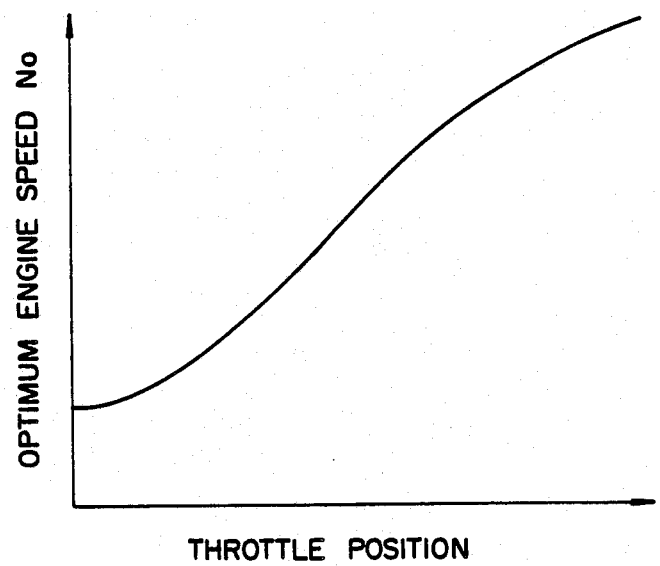
FIG. 5 is a graph representing the optimum engine speed.

FIG. 4 is a flow chart showing a desired engine speed calculating routine. The desired engine speed Ne' is basically set to the optimum engine speed No shown in FIG. 5. Referring to FIG. 5, in a vehicle having the throttle valve connected to the accelerator pedal through a link, the engine speed Nx producing engine output horse power corresponding to the throttle position $\theta$ with the minimum specific fuel consumption is set to the optimum engine speed No. However, the optimum engine speed No may be a value Nx' corrected properly by the vehicle speed V or the like on the basis of this Nx. When T1 seconds elapse after the idle switch 53 is turned on and then turned off, the desired engine speed Ne' is set to the engine speed Nf for fuel cut during the vehicle deceleration period after T1 seconds. Nf is set to be a value higher than the optimum engine speed No in the idling position and the minimum engine speed Nl for fuel cut. Thus, in the vehicle deceleration, fuel is cut until the vehicle speed V is sufficiently reduced.

Figure 6:
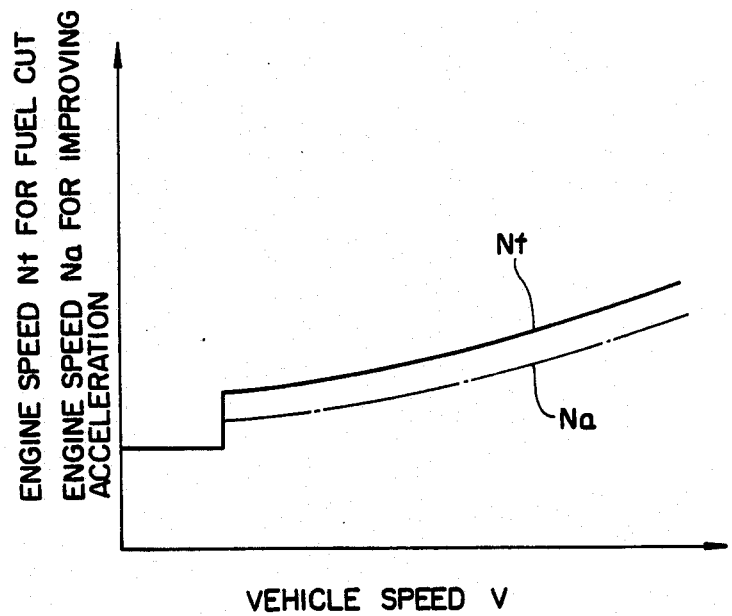
FIG. 6 is a graph representing the engine speed for improving acceleration.

Also, T1 is set to avoid troubles caused by chattering of the idle switch 53, for example to 0.1-0.2 seconds. During T2 seconds after the idle switch 53 is turned off, the desired engine speed Ne' is set to the engine speed Na for improving acceleration set separately from the optimum engine speed No. T2 is 1-2 seconds for example. FIG. 6 shows the engine speed Nf for fuel cut and the engine speed Na for improving acceleration. Nf,Na are set as a function of the vehicle speed V. The curves Nf and Na have a steplike decreasing low value at speeds lower than 10 km/h. This allows the target value of the engine speed to be lower than the maximum engine speed Nl. Therefore the engine is not subjected to a fuel cut and will not stall. Detailing each step in FIG. 4, in step 86 is judged whether or not the range is in D(drive) range, and advance is made to step 88 when the judgement is yes and the routine is completed when the judgement is no. In step 88 are detected the throttle position θ, vehicle speed V and engine speed Ne. In step 90 is substituted the optimum engine speed No calculated from the throttle position θ according to the graph in FIG. 5 for the desired engine speed Ne'. In step 92 is judged whether the idle switch 53 is turned on or off and advance is made to step 94 when it is turned on and to step 102 when it is turned off. In step 94 is compared value Tc1 of the first passed time measuring timer M1 with T1 and advance is made to step 102 when Tc1<T1 and to step 96 when Tc1>T1. In step 96 is cleared the second passed time measuring timer M2. In step 98 is calculated the engine speed Nf for fuel cut from the vehicle speed V according to the graph in FIG. 6. In step 100 is substituted Nf for the desired engine speed Ne' and advance is made to step 112. In other words, the desired engine speed Ne' is changed from the optimum engine speed No to the engine speed Nf for fuel cut. In step 102 is cleared the first passed time measuring timer M1. In step 104 is compared value Tc2 of the second passed time measuring timer M2 with T2 and advance is made to step 106 when Tc2<T2 and to step 112 when Tc2=T2. In step 106 is calculated the engine speed Na for improving acceleration from the vehicle speed V according to the graph in FIG. 6. In step 108 is compared the actual engine speed Ne with the engine speed Na for improving acceleration and advance is made to step 110 when Ne<Na and to step 112 when Ne≧Na, i.e. when the engine speed Ne is sufficient high. In step 110 is substituted Na for the desired engine speed Ne'. In other words, Ne' is changed from No to Na and advance is made to step 112. In step 112 is executed a speed change controlling routine. The speed change controlling routine itself is well known and controls the control voltage of the flow controlling valve 38 in relation to the deviation of the engine speed Ne from the desired engine speed Ne' so that the speed ratio e of the CVT 10 is changed.

Figure 7:
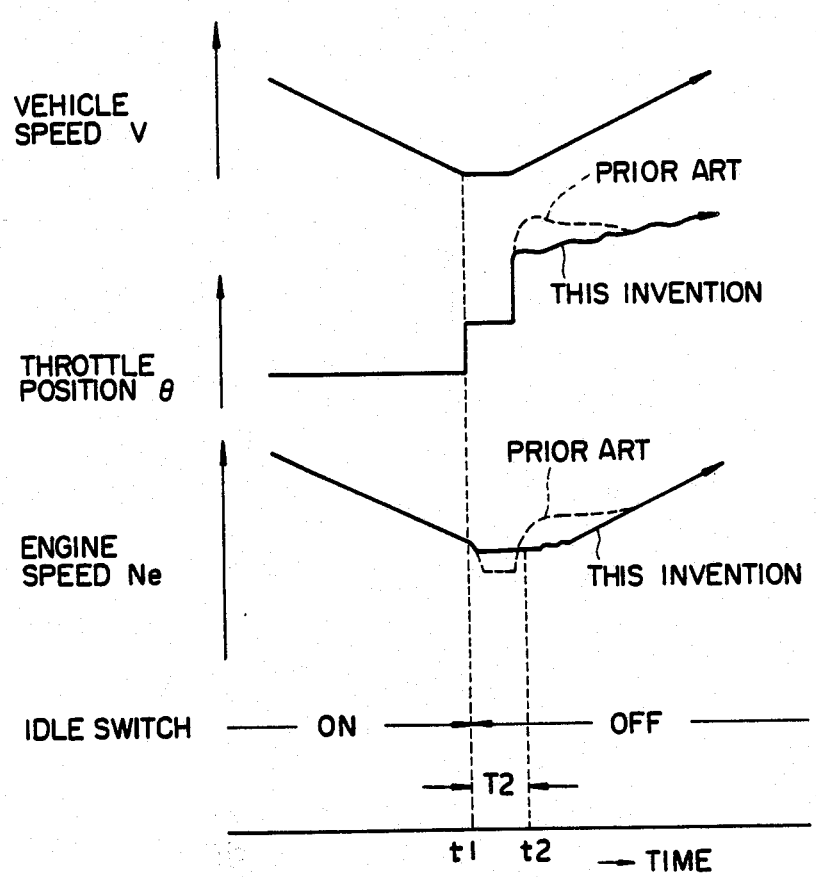
FIG. 7 is a graph showing a change with the passage of time in engine speed and others during a process from deceleration to acceleration.

FIG. 7 shows changes with the passage of time in the vehicle speed V, the throttle position θ and the actual engine speed Ne when the vehicle deceleration, the slight pedalling of the accelerator pedal 50, the vehicle acceleration and the running condition of the vehicle are changed. In θ and Ne, the solid lines show the case according to the present invention and the broken lines shown the case according to the prior art. In the prior art, when the idle switch 53 is turned from the on-condition to the off-one (time t1), the desired engine speed Ne' is set to the optimum engine speed No. The engine speed Ne is largely reduced and the throttle position θ for necessary acceleration is expanded to degrade the specific fuel consumption. Or, when the throttle position is not expanded, time taken until the engine speed Ne reaches the desired engine speed Ne' is elongated to degrade the acceleration responsive property. According to the present invention, within the predetermined time T2 after time T1 when the idle switch 53 is turned from the on-condition to the off-one, the desired engine speed Ne' is set to the engine speed Na for improving acceleration, which is different from the optimum engine speed No, so that the large reduction of the engine speed Ne is avoided to provide satisfactory acceleration responsive property while restraining the specific fuel consumption.

FIG. 8 is a functional block diagram showing the present invention. An optimum engine speed calculating means 120, an engine speed calculating means 122 for fuel cut and an engine speed calculating means 124 improving acceleration calculate respectively the optimum engine speed No, the engine speed Nf for fuel cut and the engine speed Na for improving acceleration on the basis of FIGS. 5 and 6. A timer 126 measures passed time Tc1 and Tc2. A desired engine speed calculating means 128 substitutes Nf for the desired engine speed Ne' when the idle switch 53 is turned on, the output side rotational speed Nout (∝ vehicle speed V)≠0 and Tc1≧T1, then substitutes Na for Ne' when the idle switch 53 is turned off and Tc2<T2 and No for Ne' in other periods. A control means 130 controls the speed ratio e of the CVT 10 such that the input side rotational speed Nin(=actual engine speed Ne) becomes equal to Ne'.

It will be apparent to those skilled in the art that various modifications and variations may be made in the elements of the invention without departing from the scope or spirit of the invention.

What is claimed is:

1. A vehicle comprising:
   an internal combustion engine provided with a throttle valve;
   means for detecting degrees of the opening of the throttle valve;
   means for detecting rotational speeds of the engine;
   means for supplying fuel to the engine;
   means for fully stopping the supply of the fuel to the engine when the engine is under a deceleration condition where the degree of opening of the throttle valve is in an idling state and the engine speed is higher than a predetermined value N1 larger than an idling speed;
   a continuously variable transmission system arranged between the engine and the vehicle;
   means for controlling the speed ratio of the vehicle speed to the engine speed in the transmission system;
   a first data map of a degree of opening of the throttle valve and engine speed No for obtaining a minimum fuel consumption;
   a second data map of a vehicle speed and desired speed of the engine Nf which is higher than N1 so as to attain a sufficient long stoppage of supply of fuel to attain effective deceleration;
   a third data map of a vehicle speed and engine speed Na which is higher than No for allowing a high acceleration performance when the engine is accelerated from an idling position of the throttle valve;
   means for detecting an actual speed of the vehicle;
   means for calculating, from the second map, a desired value of the engine speed, Nf corresponding to the detecting actual speed of the vehicle when the engine is under the deceleration condition;
   means for detecting a transition phase for acceleration from a condition where the degree of the opening of the throttle valve is in the idling state to a condition where the degree of the throttle opening is larger than the idling state;
   means for calculating, from the third map, a desired value of the engine speed, Na during the transient phase;
   means for calculating, from the first map, a desired value of the engine speed No after the transition phase has finished; and
   means for providing a signal directed to the transmission speed ratio controlling means so that the actual engine speed corresponds to the calculated desired speed.

2. An apparatus for controlling a continuously variable transmission as defined in claim 1, wherein a duration of the transition phase is a function of a vehicle speed.

* * * * *